United States Patent
Jaime et al.

(10) Patent No.: US 12,456,103 B1
(45) Date of Patent: Oct. 28, 2025

(54) HIGH-THROUGHPUT, LOW-LATENCY TRANSACTION PROCESSING

(71) Applicant: Deal Engine Inc., Miami, FL (US)

(72) Inventors: Abraham Jaime, Morelia (MX); Alexandro Jara, Miami, FL (US); Felix Jimenez Perez, Morelia (MX)

(73) Assignee: Deal Engine Inc., Miami, FL (US)

( * ) Notice: Subject to any disclaimer, the term of this patent is extended or adjusted under 35 U.S.C. 154(b) by 0 days.

(21) Appl. No.: 18/651,040

(22) Filed: Apr. 30, 2024

(51) Int. Cl.
*G06Q 20/04* (2012.01)
*G06Q 20/40* (2012.01)

(52) U.S. Cl.
CPC ....... *G06Q 20/0457* (2013.01); *G06Q 20/405* (2013.01)

(58) Field of Classification Search
CPC .......................... G06Q 20/0457; G06Q 20/405
USPC .......................................................... 705/44
See application file for complete search history.

(56) References Cited

U.S. PATENT DOCUMENTS

| | | | |
|---|---|---|---|
| 7,228,313 B1 | 6/2007 | Hand et al. | |
| 10,970,720 B2* | 4/2021 | Wang ................. | G06Q 30/0635 |
| 2004/0010427 A1* | 1/2004 | Barnes ................. | G06Q 10/02 |
| | | | 705/5 |
| 2004/0138930 A1* | 7/2004 | Barnes ............... | G06Q 30/0235 |
| | | | 705/5 |
| 2005/0256750 A1* | 11/2005 | Hand ..................... | G06Q 10/06 |
| | | | 705/5 |
| 2008/0010103 A1 | 1/2008 | Williamson et al. | |
| 2009/0192833 A1 | 7/2009 | Mersky | |
| 2011/0071864 A1 | 3/2011 | Hourdou et al. | |
| 2011/0087607 A1 | 4/2011 | Sane et al. | |
| 2012/0254261 A1* | 10/2012 | Edwards ................ | G06Q 10/00 |
| | | | 707/810 |

(Continued)

FOREIGN PATENT DOCUMENTS

| | | | | |
|---|---|---|---|---|
| CA | 2496219 A1 * | 8/2005 | ............. | G06Q 10/02 |
| CN | 106600291 A * | 4/2017 | ............. | G06Q 30/01 |

(Continued)

OTHER PUBLICATIONS

Sulander, Santtu. "Microservices Architecture in Open Retail Interface for Public Transport Tickets." (2018). (Year: 2018).*

(Continued)

*Primary Examiner* — Sara C Hamilton
(74) *Attorney, Agent, or Firm* — David H. Judson

(57) ABSTRACT

A method for low latency, high volume transaction processing. A set of transaction requests are received. In response to receipt of a transaction request, and for each transaction request, a set of tasks are orchestrated across a set of microservices, each of the microservices having a particular function uniquely associated with a transaction process, and wherein at least one microservice has an associated rules database. The database supports computation rules that are generated by applying natural language processing (NLP) to a rule set. Using the microservices, the set of transaction requests are concurrently processed, substantially in real-time, and by applying the set of computation rules. The results generated from concurrently processing the set of transaction requests are then returned. In one embodiment, each of the transaction requests are requests associated with an airline ticket and, in particular, a request to refund that ticket and any associated taxes and fees.

20 Claims, 3 Drawing Sheets

(56) References Cited

U.S. PATENT DOCUMENTS

| | | | |
|---|---|---|---|
| 2012/0330906 A1 | 12/2012 | Fredericks et al. | |
| 2015/0039355 A1 | 2/2015 | Gevrey et al. | |
| 2016/0098681 A1* | 4/2016 | Canis | G06Q 10/063112 |
| | | | 705/301 |
| 2016/0196508 A1 | 7/2016 | Richter | |
| 2017/0177575 A1 | 6/2017 | Florimond et al. | |
| 2019/0050858 A1 | 2/2019 | Wang | |
| 2019/0139166 A1 | 5/2019 | Walker et al. | |
| 2019/0199515 A1* | 6/2019 | Carver | G06Q 20/02 |
| 2020/0186568 A1* | 6/2020 | Erb | H04L 9/0841 |
| 2022/0091903 A1* | 3/2022 | Bai | G06F 8/60 |
| 2022/0215299 A1 | 7/2022 | Marcourt et al. | |
| 2022/0277234 A1 | 9/2022 | Uhr et al. | |
| 2024/0160488 A1 | 5/2024 | Desai et al. | |

FOREIGN PATENT DOCUMENTS

| | | | | |
|---|---|---|---|---|
| WO | WO-0102980 A2 * | 1/2001 | | G06Q 10/02 |
| WO | WO-2015032807 A1 * | 3/2015 | | G06Q 10/02 |

OTHER PUBLICATIONS

Heinsuo, Leo. Smart Ticketing: Continuous learning system for document classification. MS thesis. 2020. (Year: 2020).*
"How should the airline refund system change," Simple Flying, https://simpleflying.com/airline-refund-system-change/ Sep. 19, 2020.
Samuel, "Tackling air travel refunds and credits in business travel," https://www.egencia.com/en/tackling-air-travel-refunds-and-credits-business-travel May 21, 2020.

* cited by examiner

300

```
for (tax_code :String , applicable_taxes :HashMap<String, ApplicableTaxes> ) in tax_input_cleaned.taxes {
        let segment :TaxableSegment = applicable_taxes.values().next().unwrap().segment.clone();
        let cartesian :Vec<SegmentAddResult> = cartesian_product_2(applicable_taxes, &tax_code);
        if cartesian.len() == 0 {
                continue;
        }
        let response :SegmentAddResult = get_min_error(&cartesian, tax_target: &segment.tax_amount_usd);
        let local_currency :String = segment.tax_amount.currency.clone();
        let local_exchange_rate :f64 = segment.tax_amount.exchange_rate_usd;

let computed_tax = Amount {...};

let charged_usd = Amount {...};

let charged = Amount {...};

// calculate will_refund where difference between charged and computed is less than 1 dollar
        // print result in log result, and will refund only taxes that will be refunded
        let calculate_diff :f64 = charged_usd.amount - response.add.amount;
        result_compute.insert( k: tax_code.clone(), v: calculate_diff);
```

```
fn get_min_error (cartesian: &Vec<SegmentAddResult>, tax_target: &Amount) → SegmentAddResult {
        let mut res: SegmentAddResult = cartesian [0].clone();
        let mut max_error: f64 = tax_target.amount;

for segment :&SegmentAddResult in cartesian {
                let diff :f64 = (segment.add.amount - tax_target.amount).abs();
                if diff <= max_error {
                        res = segment.clone();
                        max_error = diff;
                }
        }
        return res;
}
```

302  FIG. 3

HIGH-THROUGHPUT, LOW-LATENCY TRANSACTION PROCESSING

BACKGROUND OF THE INVENTION

This application relates generally to low latency, high-throughput transaction processing.

Travel plans often change, sometimes at the last minute. There are many situations wherein a consumer holding an airline ticket is entitled to a refund of the ticket price and/or associated fees. The consumer is entitled to a refund due to a cancelled flight, regardless of the reason, and the consumer elects not to travel. A refund is also due to the consumer if the airline made a significant schedule change and/or significantly delay a flight and the consumer again elects not to travel. A consumer also is entitled to refund if the consumer is involuntarily moved to a lower class of service. In another scenario, a consumer is entitled to refund of fees paid for an optional service (e.g., baggage fees, seat upgrades, in-flight services, etc.) if the consumer was unable to use the optional service due to a flight cancellation, delay, schedule change, or the like. In addition, a consumer is entitled to a refund if the consumer paid a baggage fee and the airline declares the baggage lost. Finally, a consumer that purchases a fully refundable ticket is entitled to refund if he or she does not the purchased ticket to complete travel. In addition to the airlines themselves, ticket agents and online travel agencies are required to make proper refunds when service cannot be performed as contracted on a flight to, within, or from the United States.

For tickets issued in the U.S., airlines and third parties involved in the ticketing process are required to make refunds promptly. For airlines, "prompt" is defined as being within seven (7) business days if a passenger paid by credit card, and within twenty (20) days if a passenger paid by cash or check. Ticket agents and online travel agencies, however, have no such temporal requirements. Other countries have their own ticket refund regulations and practices.

Currently, the ticket refund process is highly manual, prone to error, and time-consuming for travelers and travel agents alike.

SUMMARY OF THE INVENTION

A method and system for low latency, high-throughput transaction processing, e.g., to facilitate airline ticket refunds, is described.

According to an exemplary embodiment, a set of transaction requests are received. In response to receipt of a transaction request, and for each transaction request, a set of tasks are orchestrated across a set of microservices, each of the microservices having a particular function uniquely associated with a transaction process, and wherein at least one microservice has an associated rules database. The database supports computation rules that are generated by applying natural language processing (NLP) to a rule set. Using the microservices, the set of transaction requests are concurrently processed, substantially in real-time, and by applying the set of computation rules. The results generated from concurrently processing the set of transaction requests are then returned. In one embodiment, each of the transaction requests are requests associated with an airline ticket and, in particular, a request to refund that ticket and any associated taxes and fees.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the disclosed subject matter and the advantages thereof, reference is now made to the following descriptions taken in conjunction with the accompanying drawings, in which:

FIG. 3 depicts representative pseudocode that implements a non-linear polynomial discrete-time system computation in a tax computation microservice.

DETAILED DESCRIPTION OF THE INVENTION

Figure 1:
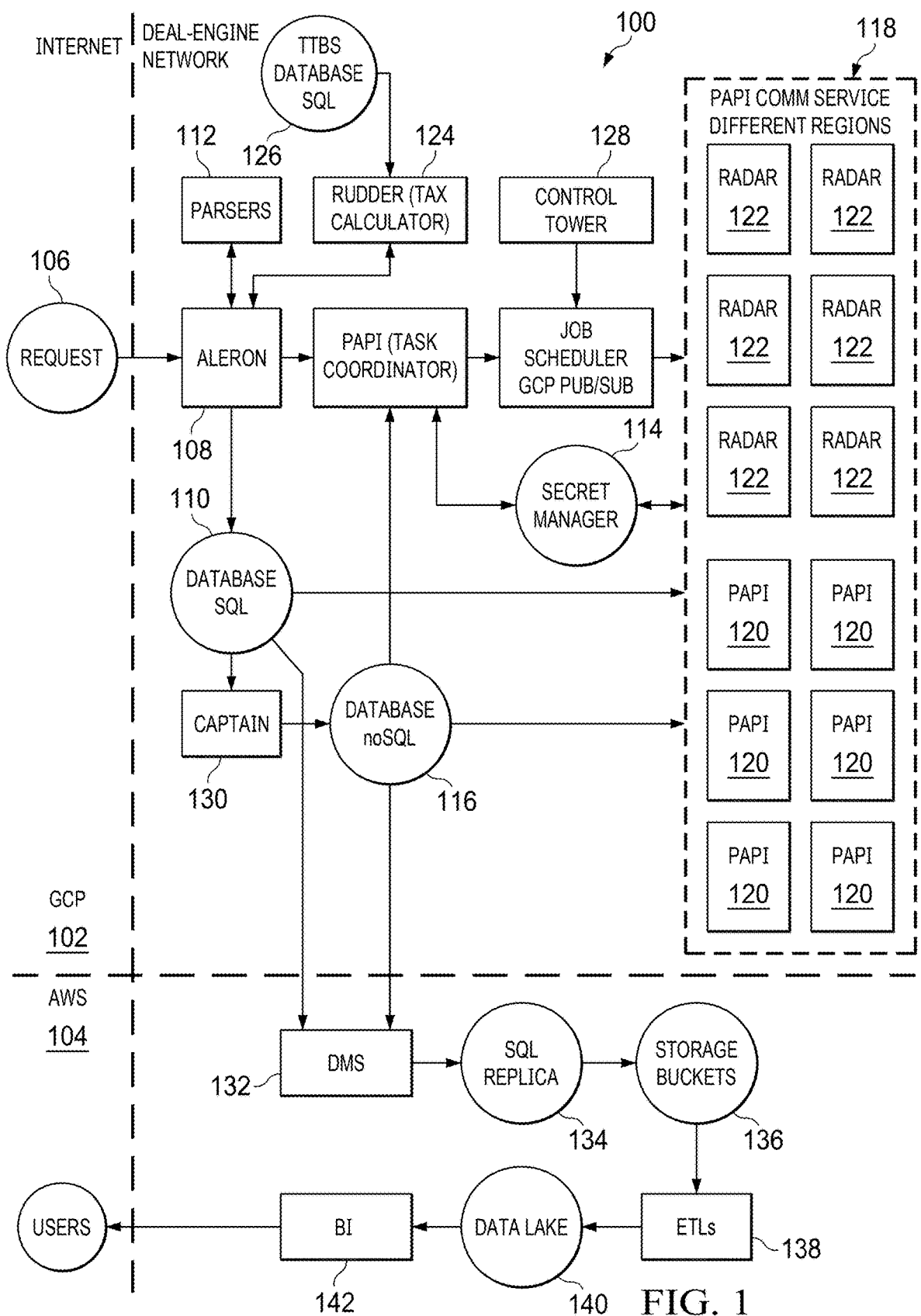
FIG. 1 depicts a network-accessible transaction processing system in which the techniques of this disclosure may be implemented.

As noted above, and in an exemplary (but non-limiting) embodiment, the operating domain in general is airline ticket refund processing. Traditionally, airline ticket purchases involve Global Distribution Systems. Examples of popular GDS platforms include Amadeus®, Sabre®, and Galileo®. A Global Distribution System (GDS) is a computerized network system owned or operated by a company that enables transactions among travel industry service providers, mainly airlines, hotels, car rental companies, and travel agencies. Typically, a GDS mainly uses real-time inventory (e.g. number of hotel rooms available, number of flight seats available, or number of cars available) from the service providers. Travel agencies traditionally relied on GDS for services, products and rates in order to provide travel-related services to the end consumers. Thus, traditionally a GDS links services, rates and bookings consolidating products and services across all three travel sectors: i.e., airline reservations, hotel reservations, car rentals. GDS is different from a computer reservation system, which is a reservation system used by the service providers (also known as vendors). The primary customer of GDS are travel agents (both online and office-based), who make reservations on various reservation systems run by the vendors. GDS holds no inventory; the inventory is held on the vendor's reservation system itself, and a GDS system typically has a real-time link to the vendor's database. For example, when a travel agency requests a reservation on the service of a particular airline company, the GDS system routes the request to the appropriate airline's computer reservations system. Global distribution systems in the travel industry originated from a traditional legacy business model that existed to inter-operate between airline vendors and travel agents. During the early days of computerized reservations systems flight ticket reservations were not possible without a GDS. As time progressed, many airline vendors have adopted a strategy of direct selling to their wholesale and retail customers (passengers). They invested heavily in their own reservations and direct-distribution channels and partner systems.

By way of further background, in the airline industry a Billing and Settlement Plan (BSP) is an electronic billing system designed to facilitate the flow of data and funds between travel agencies and airlines. The advantage of such an intermediary organization is that instead of each travel agency having an individual relationship with each airline, all of the information is consolidated through the BSP. Typically, BSP's are organized on a local basis, usually one per country. There are BSP operations worldwide, and they provide services for the settlement of financial transactions between travel agents and airlines. Tickets sold via travel agencies outside of the United States are processed by the BSP of the International Air Transport Association (IATA), a trade association for the world's airlines, and through its BSPlink internet-based system. Settlements for tickets sold via agencies within the United States typically are processed by ARC, operated by the Airline Reporting Corporation. There are several other legacy settlement systems. BSP and ARC facilitate these interactions and exchanges of information and settlements between and among all participants.

In a typical use case, consumer holding an airline ticket is entitled to a refund of the ticket price and/or associated fees. In this context, end users typically are consumers or persons/entities acting on their behalf and that interact with a transaction processing system (TPS) service using desktop computers, laptop computers, web-connected appliances, and mobile devices (smartphones and tablets). Preferably, an end user accesses the service using a computing device that comprises a CPU (central processing unit), computer memory, such as RAM, and a drive. The device software includes an operating system, and generic support applications and utilities. A computing device executes a browser, browser plug-in, or dedicated mobile app that renders web pages received from the service. Typically, the computing device connects to the server environment providing the "service" in a secure manner, e.g., via a TLS-secured connection, and must be authenticated (or otherwise authorized) into a collaboration session. Alternatively or in addition to direct consumer interactions, interactions with the TPS service also are carried out programmatically, e.g., via an Application Programming Interface (API), or other request-response workflow.

The TPS "service" preferably is hosted in a cloud-based environment that comprises a set of services (or components). The service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Generalizing, the cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines.

Typically cloud-based services are delivered through virtual machines (VMs) or containers. A virtual machine is a complete guest host running inside of a host system. When virtual machines are used, applications are installed, packaged, and run under the control of a hypervisor, which virtualizes the hardware environment. Containers, in contrast, provide an operating environment wherein only the essential parts of the application (sometimes referred to as cloud services) and its dependencies are included, and there can be multiple containers running within a single instance of an operating system, such as Linux. Docker is a virtualization platform that shares a single Linux kernel with all running instances (called containers). Other container-based technologies include, among others, Kubernetes, and OpenShift. Generalizing, a container typically is a single software unit packaged with all of its dependencies into an image designed to run reliably on diverse systems. Container resources are managed via process control groups and isolated via kernel namespaces. A container orchestration engine decides where containers will run in a managed cluster, as well as creates a private network for communication.

The above-described technology platform preferably supports a Microservices architecture. Microservices is an application architectural style in which an application is composed of many discrete, network-connected components called microservices. In this approach to application design and management, large monolithic applications are broken into small services. A single network-accessible service is the smallest deployable unit for a microservices application. Typically, each microservice is optimized for a single function and runs in its own process. Communications between microservices typically are conducted through RESTful APIs and message broker services. Because a microservice is usually just a single task, is language-agnostic and does not require significant dependences, it is well-suited to implementation in a container-based operating environment. Developers of software applications regularly split large distributed systems into communicating microservices that all run in parallel, e.g., within a Container Orchestration Engine (COE), such as Kubernetes. Each Orchestration Engine takes an image that contains an application, its dependencies, and a small Operating System (OS) distribution in a layered filesystem, and it creates a process within its own namespaces on a hardware node.

FIG. 1 depicts the low latency, high-throughput distributed transaction processing system (TPS) 100 of this disclosure. The system may be implemented in one or more cloud environments, such as Google® Cloud Platform (GCP), and Amazon® AWS. The designation of these commercial systems is not intended to be limiting. In this example embodiment, a first (transaction processing) portion 102 of the TPS executes in a first cloud, e.g., GCP, and a second (data analytics) portion 104 of the TPS executes in a second cloud, e.g., AWS. Using independent cloud services is not a requirement. As will be described, most of the components of the TPS are implemented as microservices, preferably within a container-based operating environment, as described above.

The first portion 102 of the transaction processing system 100 operates a refund processing workflow and typically is triggered programmatically as a result of receiving a transaction request 106. Typically, a transaction request 106 is received in batch, together with other transaction requests, although this is not a limitation. This portion of the TPS includes a central controller microservice 108 that provides several high level functions: authentication and authorization, job scheduling, microservices coordination, and database integration. In particular, the central controller 108 provides secure access to the platform by managing user authentication and authorization, verifying user identities and controlling their access to various services. The "user" in this context typically is a travel agent, or an online service such as Expedia® or many others. Regarding scheduling, the central controller 106 orchestrates tasks across the microservices architecture by triggering tasks in response to events and user requests. More generally, the central controller 108 serves as a hub for communication among the various microservices depicted. Preferably, the controller uses a publish/subscribe mechanism for this purpose. The central controller uses a database 110 (e.g., PostgreSQL) as its primary transaction database to provide data consistency and reliability. As depicted, the TPS portion 102 also includes a parsers microservice 112 that assists in automating the interpretation of complex fare and tax rules (obtained, e.g., from airline documentation). To this end, the central controller 108 invokes the parsers microservice 112, e., via HTTP, when rule parsing is required, and the parsers microservice 112 provides rule parsing, and responds with parsed rule data. The parsers microservice operates externally to the refund request processing flow to extract penalties and conditions from airline rule documents and formulating them in a machine-readable manner. Thus, when the parsers microservice is invoked by the central controller during a refund request workflow, the rules are applied accurately and with no latency.

The system 100 also a secrets protection microservice 114 that is responsible for securely storing and managing secrets and authentications sessions. In particular, the secrets microservice 114 securely stores client secrets and authentication sessions, providing a centralized repository for sensitive data. Preferably, each client (e.g., a travel agency, an online ticket reservation service, etc.) has its own unique set of secrets for various airline systems, such as BSP, Sabre® and Amadeus® and others. This microservice also provides for data storage of these secrets, e.g., in a database 116 (e.g., NoSQL) for robust data security. As also depicted, the system 100 includes a communication service 118 that is configured to provide communication services to the central controller to facilitate transaction processing. This communication service 118 comprises pairs of sub-components, namely, a manager sub-component 120, and a web scraping sub-component 122. Typically, there are multiple pairs of such components to enable the system to interact with a plurality of third party systems and services. The manager sub-component 120 of the communication service 118 is responsible for vendor selection based on client and operating country or region, secrets retrieval (from database 116) for vendor authentication, storing data related to vendor interactions and returning responses to the central controller for further processing, and for managing job scheduling for web scraping tasks performed by an associated web scraping sub-component 112. Web scraping (or more generally data acquisition) typically is performed when APIs or web services are unavailable to the system for any reasons. To this end, the web scraping sub-component scraps a vendor site (typically on a permission basis) and downloads sales data, flight status information, and the like, and it manages fulfillments.

A main processing microservice 124 in the system is for tax calculation. Typically, an airline ticket includes many (e.g., up to half a dozen) different taxes. Thus, for example, a ticket for travel that originates at an origin may have an intermediary destination and a final endpoint, such that the travel involves several segments or legs, and has one or more associated coupons. Formally, a segment is the operation of a flight with a single flight designator (flight number) between the point where passengers first board an aircraft and their final destination. A leg is a trip of an aircraft from one airport to another. A flight coupon means that part of a ticket or e-ticket that indicates the particular points of departure and of arrival (flight segment) between which the passenger is entitled to be carried with their baggage. A typical airline ticket may involve may different taxes that are split across each segment or coupon, and thus there are often complex tax computations that are necessary to be performed for refund applications. To this end, the tax computation microservice 124 is a preferably RUST-based microservice that performs complex tax calculations for refund applications. In particular, this microservice provides several services including tax rate parsing (e.g., from IATA TTBS datasets), segment/coupon analysis (identifying all applicable taxes for each flight segment or coupon, taking into account all meaningful information from the country, airport or airline tax, and from the ticket information), performs dynamic data handling (applying the correct version of the rules in effect at the time of the original booking), and implements a discrete-time control system for finding the closest applicable tax rule calculation. Data used by this microservice is stored in an associated database 126. To process the tax rules that might impact a refund, the tax calculation microservice 124 operates out-of-band of the particular refund request workflow, preferably using a Natural Language Processing (NLP) sub-system to learn the tax rules. Natural language processing (NLP) is the parsing and semantic interpretation of text, which allows systems to learn, analyze, and understand human language. Text representation plays an important role in many natural language processing (NLP) tasks, such as document classification and clustering, sense disambiguation, machine translation, and document matching. Using NLP, the tax computation microservice 124 takes a large number of tax rules (and their millions of possibilities as applied to a given ticket and its multiple segment and coupon options) and generates a highly-reduced or compressed number of rules (ordered in the hundreds) that are then applied on a real-time basis for a specific refund computation. These final rules are available to be stored and used in-memory for high-throughput computational and storage efficiency. In addition to using NLP in microservice 124, preferably the parsers microservice described above also leverages NLP.

The following provides additional details regarding how the tax calculation microservice operates in a preferred embodiment. As noted above, this microservice typically operates separately from a refund request workflow; as will be seen, this separation provides significant advantages to the overall system workflow due to the complexity of managing the tax computations. In operation, the microservice first performs a search function for identifying potentially applicable taxes associated with a given ticket. For any given ticket, typically there is a data set comprising: (i) general information (ticket identifier, ticket number, issue data, origin airport, destination airport, departure date and time, and connection type); (ii) a set of one or more coupons; and (iii) a set of one or more tax codes and their associated amounts charged. Based on this information, the microservice constructs a cartesian product set with respect to the particular ticket for all coupons and all taxes identified in the search. In particular, and according to this step, it is assumed that every tax identified could apply to every coupon identified. Thus, if the search identifies two coupons and five tax codes (and associated amounts), the cartesian product is a set of ten (10) rows of data indexed by {origin airport code, destination airport code, tax code, tax amount and currency code}. To complete the search function for the ticket, the tax codes are then searched against tax codes in a tax database, such as the IATA database. This query is used to filter any row identified in the cartesian product set that does not match against a match rule (e.g., matching the applicable airport to that of the coupon, matching the date from the ticket to any applicable taxes for that data, matching the segment type with a tax type (e.g., domestic or international), and so forth. Depending on the ticket and the number of tax combinations that may be generated, the search function may produce a large number of results (hits from the database search). Indeed, for some tickets, the number of combinations of taxes may number in the many millions, or possibly be as low as a 10. This depends on the number of coupons and taxes charged, as well as the complexity of the tax.

The information gathered in the search function is every applicable tax per coupon. The tax calculation is then carried out based on this information. This is a difficult computational problem to carry out at scale because, for many taxes, the same tax is applied to more than one coupon and with a different amount. To address this problem, the microservice implements a non-linear polynomial discrete-time system that provides a successive approach. FIG. 3 depicts representative pseudocode to carry out this processing. In particular, and because it is known (from the ticket) the total amount that was charged for a given tax, the microservice iterates over every combination and use a discrete-time system to filter any combinations that are not possible based on an error margin (e.g., $1 USD). The code depicted at 300 iterates over each tax code to obtain a minimum error for a target amount. The code depicted at 302 is used the calculate the minimum error. The result from this processing is the detail of which tax applies to each coupon and how much was charged. This ensures that the system can provide a correct refund.

The system also includes a vendor health monitoring microservice 128, which is responsible for monitoring the health of vendors, such as the GDSs and BSP. This microservice continually assesses the status and performance of vendors, and it provides alerts, notifications, and the like with respect to any vendor availability or service issues. The service also provides actionable insights based on the vendor health assessments, and predefined actions may be defined (as well as their triggers) to enable the system to maintain service quality and reliability. Additionally, the system preferably includes a management microservice 130 for navigating business-specific rules, facilitating large-scale refund processing, and handling other administrative and management tasks for the platform, such as invoicing and reporting. In particular, the management microservice 130 is responsible for managing and coordinating business-specific rules for clients, e.g., pricing structures, policy exceptions, and other customized parameters. It also enables the task of pre-processing refunds at scale, and this includes automating refund calculations based on various factors sch as fare rules, tax rules, and client-specific policies. The microservice also generates invoices and reports that comply with client-specific requirements.

Referring back to FIG. 1, the second portion 104 of the system provides a data analysis sub-system, which typically is an internal operation that enables the service provider of the platform to make data-driven decisions efficiently. To this end, the sub-system includes a data migration service (e.g., AWS DMS) 132 to migrate relational databases, data warehouses, NoSQL databases, and other types of data stores from the first portion of the system. The output of the DMS is a database replica 134 that is then stored in a set of storage buckets 136. For analytics, the sub-system supports an Extract, Transform and Load (ETL) pipeline 138, such as AWS Glue, Kinesis and Firehose. ETL is the process of combining data from multiple sources into a large, central repository called a data warehouse (data lake 140). ETL uses a set of business intelligence or rules 142 to clean and organize raw data and prepare it for storage, data analytics, and machine learning (ML). This microservice provides real-time insights, e.g., via AWS Athena and Redshift) to facilitate operations of the system.

Figure 2:
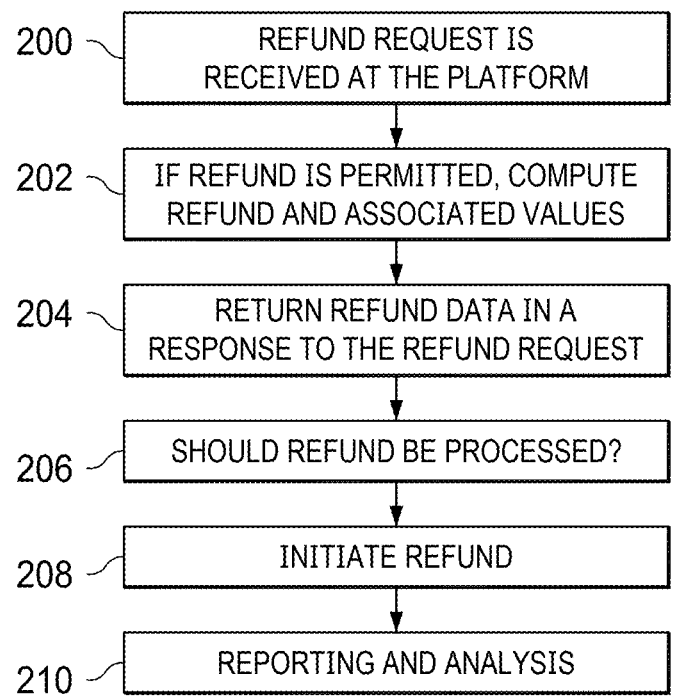
FIG. 2 depicts a process flow for transaction handling using the transaction processing system.

FIG. 2 depicts a process flow for a transaction, in a representative case a request for a refund associated with an unused airline ticket. As noted above, there may be several circumstances wherein a consumer is entitled to a refund of ticket fees and taxes, and associated optional service fees, namely: a cancelled flight, a significant schedule change and/or significant travel delay caused by the airline, the airline involuntarily moving the consumer to a lower class of service, an unused fully-refundable ticket, and lost baggage. The process begins at step 200 with a refund request being received by the platform. For simplicity, the refund request may be considered in isolation (as a single request from a single consumer), but this is not a limitation. The platform is configured for handling multiple requests received, e.g., in a batch process. As noted above, requests for refunds (and associated taxes and fees) are presumed to arrive in high volume, and the transaction processing is carried out with very low latency and high-throughput and for a large number of participants (e.g., travel agents, online agencies, individuals, etc.). As also noted, typically the refund request is received via an API, or via a web-based user interface (UI). The central controller receives the refund request and invokes its authentication and authorization services, and its job scheduling. To this end, the central coordinator sets up a refund processing job and initiates orchestrating of the one or more tasks that are needed to process the request. At step 202, a refund is calculated. The refund calculation typically involves multiple distinct queries by the central controller or other microservices under its control to one or more of the internal (and possibly external) data sources, e.g., to check fare and penalty rules (via the parser microservice), to compute the appropriate taxes (via the tax computation microservice), to check for availability of vendor- or client-specific rules, and the like. The multiple distinct queries may be made according to system-supplied priorities, which in turn may be governed by other data, e.g., service levels, data source availability or reachability, and the like. At step 204, and in response to the request, the results of the refund computation are returned by the central controller, e.g., to the requesting entity (a consumer, a travel agent, an online travel service, etc.). Typically, the results comprise an indication whether there is an entitlement to a refund, together with the amount of the refund. As described above, typically the refund includes the cost of the ticket, and the taxes incurred on that ticket, all as constrained/scoped by the segments/coupons involved. As step 206, a determination is made whether to process the refund. This determination may be based on a pre-configured policy or configuration, or it may be responsive to receipt (from the requesting entity) of a process refund instruction. If the outcome of the test at step 206 is positive, the flow continues at step 208 to initiate the refund processing. Typically, step 208 involves the system sending control signaling to an external settlement system (e.g., ARC, PSPlink, or the like), as well as to the airline's ticket reservation system. The control signaling causes these third party systems to cancel the reservation, change the ticket's coupon status (from "open" to "refunded"), and to programmatically initiate the actual refund of the funds involved. All or some of these operations are typically implemented in a programmatic manner. At step 210, the processed refund it provided to reporting and analysis systems.

The above-described system is configured to process a typical refund in approximately one (1) second, with tens of thousands of refunds being scheduled for processing concurrently.

The commercial system components described above are not intended to be limiting.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux. One or more of the system components may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The techniques herein provide for improvements to technology or technical field, e.g., settlement-based transaction processing systems, as well as improvements to various technologies, all as described.

What we claim is as follows:

1. A method, comprising:
   executing computing-based operations in a computing infrastructure comprising computer hardware and computer software, the computer software comprising a set of microservices having an associated rules database, each of the microservices in the set of microservices having a particular function uniquely associated with a transaction process, wherein at least one particular microservice of the set of microservices is a computer network-accessible software unit deployed in a dedicated process in the computing infrastructure and that comprises a search function and a discrete-time system, wherein executing the computing-based operations comprises:
   generating a set of computation rules by applying machine-based Natural Language Processing (NLP) to a rule set;
   hosting an instance of the set of computation rules in computer memory in the computer hardware;
   receiving a set of transaction requests;
   responsive to receipt of a transaction request, and for each transaction request, orchestrating a set of tasks across the set of microservices;
   using the set of tasks orchestrated for each transaction request, concurrently processing the set of transaction requests in the set of microservices, in real-time, wherein one or more of the transaction requests are processed at least in part by the particular microservice (i) applying the search function against the set of computation rules hosted in the computer memory to generate a data set, and (ii) thereafter applying the discrete-time system against the data set; and
   returning results generated from concurrently processing the set of transaction requests.

2. The method as described in claim 1, wherein each of the transaction requests are requests associated with a ticket.

3. The method as described in claim 2, and for a particular ticket, determining whether to initiate a refund associated with the ticket, wherein the refund includes one or more values generated by using the computation rules.

4. The method as described in claim 3, further including providing control signaling to one or more third party systems to initiate settlement of the refund.

5. The method as described in claim 1, wherein the set of tasks are orchestrated using a central controller.

6. The method as described in claim 1 wherein communications to and from the central controller are carried out via a publish and subscribe mechanism.

7. The method as described in claim 1, further including authenticating and authorizing the request prior to orchestrating the set of tasks.

8. The method as described in claim 1, wherein applying the search function against the set of computation rules includes identifying one or more segments or other identifiers associated with the transaction request, and using the set of computation rules to determine one or more values of the one or more segments or other identifiers.

9. The method as described in claim 8, wherein the transaction request is a request for a refund of an airline ticket, the one or more values are taxes associated with a travel segment or coupon, and wherein the particular microservice is a tax calculation microservice that executes the search function and a non-linear polynomial discrete-time system to identify a tax associated with each travel segment or coupon.

10. The method as described in claim 1, wherein the set of transaction requests are received programmatically from one or more third party computing systems.

11. The method as described in claim 1, wherein the method provides a network-accessible service for airline ticket refunds.

12. The method as described in claim 1, wherein a microservice is executed in a container.

13. The method as described in claim 1, further including receiving from one or more third party computing systems given data that is at least one of: pricing structures, policy exceptions and other client-specific parameters, and using the given data to generate the result for a given transaction request.

14. A computing platform, comprising:
computing hardware;
computer software executing on the computer hardware, the computer software comprising a set of microservices having an associated rules database, each of the microservices in the set of microservices having a particular function uniquely associated with a transaction process, wherein at least one particular microservice of the set of microservices is a computer network-accessible software unit deployed in a dedicated process in the computing platform and that comprises a search function and a discrete-time system, the computer software comprising computer program instructions executed on the computing hardware to perform computing-based operations comprising:

generating a set of computation rules by applying machine-based Natural Language Processing (NLP) to a rule set;
hosting the set of computation rules in computer memory in the computer hardware;
receiving a set of transaction requests;
responsive to receipt of a transaction request, and for each transaction request, orchestrating a set of tasks across the set of microservices;
using the set of tasks orchestrated for each transaction request, concurrently processing the set of transaction requests in the set of microservices, in real-time, wherein one or more of the transaction requests are processed at least in part by the particular microservice (i) applying the search function against the set of computation rules hosted in the computer memory to generate a data set, and (ii) thereafter applying the discrete-time system against the data set; and
return results generated from concurrently processing the set of transaction requests.

15. The computing platform as described in claim 14, wherein each of the transaction requests are requests associated with an airline ticket.

16. The computing platform as described in claim 15, wherein the computer program instructions are further executed on the computer hardware to determine whether to initiate a refund associated with the airline ticket, wherein the refund includes one or more values generated by using the computation rules.

17. The computing platform as described in claim 16, wherein the computer program instructions are further executed on the computer hardware to provide control signaling to one or more third party systems to initiate settlement of the refund.

18. The computing platform as described in claim 14, operated as a network-accessible service.

19. The computing platform as described in claim 14, wherein the computer program instructions executed on the computer hardware to apply the search function against the set of computation rules includes computer program instructions that identify one or more segments or other identifiers associated with the transaction request, and use the set of computation rules to determine one or more values of the one or more segments or other identifiers.

20. The computing platform as described in claim 19, wherein the transaction request is a request for a refund of an airline ticket, the one or more values are taxes associated with a travel segment or coupon, and wherein the particular microservice is a tax calculation microservice that executes the search function and a non-linear polynomial discrete-time system to identify a tax associated with each travel segment or coupon.

* * * * *